(12) United States Patent
Löffler et al.

(10) Patent No.: US 7,348,390 B2
(45) Date of Patent: Mar. 25, 2008

(54) STABLE DISPERSION CONCENTRATES

(75) Inventors: Matthias Löffler, Niedernhausen (DE); Roman Morschhäuser, Mainz (DE); Livio Caribé Da Rocha, Sao Paulo (BR)

(73) Assignee: Clariant Produkte (Deutschaand) GmbH, Sulzbach (DE)

( * ) Notice: Subject to any disclaimer, the term of this patent is extended or adjusted under 35 U.S.C. 154(b) by 609 days.

(21) Appl. No.: 10/393,546

(22) Filed: Mar. 21, 2003

(65) Prior Publication Data

US 2003/0232027 A1    Dec. 18, 2003

(30) Foreign Application Priority Data

Mar. 27, 2002   (DE) .............. 102 13 623.8

(51) Int. Cl.
*C08F 120/58*  (2006.01)
*C08F 128/02*  (2006.01)
*C08K 5/00*  (2006.01)

(52) U.S. Cl. .............. 526/287; 526/547; 526/801; 526/814

(58) Field of Classification Search .............. 524/801, 524/814, 547; 526/287
See application file for complete search history.

(56) References Cited

U.S. PATENT DOCUMENTS

| | | | |
|---|---|---|---|
| 5,104,645 A | 4/1992 | Cardin et al. ............. | 424/70 |
| 5,346,986 A * | 9/1994 | Schneider et al. .......... | 528/495 |
| 5,879,718 A * | 3/1999 | Sebillote-Arnaud ........ | 424/70.5 |
| 6,630,131 B2 * | 10/2003 | Chevalier et al. ............ | 424/59 |

FOREIGN PATENT DOCUMENTS

| | | |
|---|---|---|
| CA | 2 209 060 | 12/1997 |
| DE | 196 25 810 | 1/1998 |
| EP | 816 403 | 1/1998 |

OTHER PUBLICATIONS

English abstract for EP 816403, Jan. 7, 1998.

* cited by examiner

*Primary Examiner*—Kelechi C. Egwim
(74) *Attorney, Agent, or Firm*—Tod A. Waldrop

(57) ABSTRACT

The invention provides stable dispersion concentrates comprising:

I) 5 to 80% by weight, preferably 10 to 80% by weight, particularly preferably 20 to 60% by weight, especially preferably 30 to 40% by weight, of a polymer which, in random distribution, consists of 90 to 99.99% by weight of monomers of the formula (1)

$$H_2C=CHCONHC(CH_3)_2CH_2SO_3X \qquad (1)$$

and 0.01 to 10% by weight of crosslinking structures originating from monomers with at least two olefinic double bonds, where X is a cation or a mixture of cations, and X must consist of not more than 10 mol % of protons, II) 20 to 95% by weight of one or more emulsifiers and/or an oil phase, and III) 0 to 30% by weight of water.

5 Claims, No Drawings

STABLE DISPERSION CONCENTRATES

The present invention relates to dispersion concentrates comprising polymers based on acryloyldimethyltauric acid or salts thereof (AMPS).

These polymers, described in EP 816 403, based on acryloyldimethyltauric acid and salts thereof, preferably prepared by precipitation polymerization, confer broad performance properties and can be used as thickener, bodying agent, emulsifier, dispersant, lubricant, conditioner and/or stabilizer in cosmetic, dermatological and pharmaceutical compositions.

The polymers based on AMPS, prepared preferably by precipitation polymerization, in accordance with the prior art are pulverulent substances with performance disadvantages resulting therefrom. In addition to a risk of dust explosion, the dust can harbor dangers in cases of inhalation, and also the storage stability of the powders is impaired by hygroscopicity.

When processing or using the pulverulent products, the dissolution operation (the polymers are preferably incorporated into aqueous media) is in most cases very time-consuming. The dissolution operation of the pulverulent products can, depending on the size of the batch, take one hour and more. In addition, incomplete dissolution/swelling of the pulverulent products is often observed, which leads to a reduction in the quality and stability of the end formulation (formation of lumps). In addition, the processing and/or use of the pulverulent products generally requires specific stirring and dispersion devices in order to dissolve, or suspend, the AMPS polymers in the compositions.

The object was to find liquid forms of the pulverulent polymers, described in the abovementioned applications, based on acryloyldimethyltauric acid or salts thereof, preferably prepared by precipitation polymerization (AMPS). Preference is given here to dispersions of the polymers in a liquid matrix comprising oil, emulsifier, dispersant and/or water. Preference is given here to liquid-disperse forms with the highest possible polymer proportion, low viscosity coupled with high stability of the dispersion. The oil and emulsifier/dispersant proportions used are preferably cosmetically and pharmaceutically acceptable raw materials.

Surprisingly, it has been found that AMPS polymers are suitable in an excellent manner for the preparation of dispersion concentrates.

The invention provides stable dispersion concentrates comprising

I) 5 to 80% by weight, preferably 10 to 80% by weight, particularly preferably 20 to 60% by weight, especially preferably 30 to 40% by weight, of a polymer which, in random distribution, consists of 90 to 99.99% by weight of monomers of the formula (1)

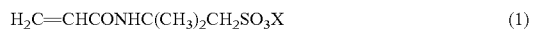

$$H_2C=CHCONHC(CH_3)_2CH_2SO_3X \qquad (1)$$

and 0.01 to 10% by weight of crosslinking structures originating from monomers with at least two olefinic double bonds, where X is a cation or a mixture of cations, and X must consist of not more than 10 mol % of protons, II) 20 to 95% by weight, preferably 20 to 90% by weight, particularly preferably 40 to 80% by weight, especially preferably 60 to 70% by weight, of one or more emulsifiers and/or an oil phase, and III) 0 to 30% by weight, preferably 0 to 10% by weight, particularly preferably 0 to 5% by weight, of water.

Preferably, the dispersion concentrates according to the invention comprise polymers containing 98 to 99.5% by weight of radicals of the formula (1) and 0.5 to 2% by weight of crosslinking structures originating from monomers with at least two olefinic double bonds.

The symbol X in the formula 1 is, in particular, a proton, a cation of an alkali metal, an equivalent of a cation of an alkaline earth metal or an ammonium ion.

Particularly preferred polymers comprise 90 to 100 mol % of the cations X from ammonium ions and 0 to 10 mol % of protons.

Crosslinkable structures originating from monomers with at least two olefinic double bonds are preferably derived from, for example, dipropylene glycol diallyl ether, polyglycol diallyl ether, triethylene glycol divinyl ether, hydroquinone diallyl ether, tetraallyloxyethane or other allyl or vinyl ethers of multifunctional alcohols, tetraethylene glycol diacrylate, triallylamine, trimethylolpropane diallyl ether, methylenebisacrylamide, divinylbenzene or trimethylolpropane tri(meth)acrylate.

The polymers used according to the invention in dispersion concentrates can be prepared by free-radical polymerization of 90-99.99% by weight of the compound of the formula (1) and 0.01-10% by weight of one or more crosslinkers which contain at least two olefinic double bonds.

Preferably, these polymers are prepared
a) by dissolving or dispersing the compound of the formula (1) in a solvent or solvent mixture, where X can in this case also consist of up to 100 mol % of protons;
b) optionally neutralizing the resulting solution or dispersion by means of one or more bases, so that at least 90 mol % of the sulfonic acid is converted into the salt form,
c) adding one or more crosslinkers with at least two olefinic double bonds to the solution or dispersion obtained as in a) and b) and
d) starting the polymerization in a manner known per se using free radical-forming compounds at a temperature of from 10 to 150° C., where the solvent or solvent mixture mentioned in a) is chosen such that the resulting polymers are largely insoluble in the solvent or solvent mixture.

Specifically, the described polymers can be prepared by precipitation polymerization as follows. The reaction medium used is preferably a water-soluble alcohol or a mixture of two or more water-soluble alcohols with 1 to 4 carbon atoms, preferably in tert-butanol, where the water content of the alcohol or alcohol mixture must not exceed 10% by weight. The type and amount of solvent is chosen so that the amount used of 2-acrylamido-2-methylpropanesulfonic acid and/or the salt to be polymerized is largely soluble or dispersible. Largely soluble or dispersible is understood as meaning that, after the stirrer has been scraped off, no solid material settles out from the solution or dispersion. The polymer which forms in the course of the reaction, by contrast, should, however, be largely insoluble in the chosen solvent (or solvent mixture). Largely insoluble or dispersible is understood as meaning that, also after switching off the stirrer, no solid material settles out of the solution or dispersion. The polymer which forms in the course of the reaction, by contrast, should, however, be largely insoluble in the chosen solvent (or solvent mixture). Largely insoluble is understood here as meaning that, in the course of the polymerization, a readily stirrable slurry-like polymer mass is produced in which no lumps or agglutinations may form. The filtrate obtainable by filtering the paste with suction should have a solids content of at most 5% by weight. If the polymers are soluble to a greater extent in the chosen solvent or solvent mixture, lumps may result as the polymer paste is dried.

The polymerization reaction itself is triggered in a manner known per se using free radical-forming compounds, such as azo initiators (e.g. azobisisobutyronitrile), peroxides (e,g, dilauryl peroxide) or persulfates in a suitable temperature interval from 20 to 120° C., preferably between 40 and 80° C., and continued over a period of from 30 min to several hours.

As well as comprising the copolymer, the dispersion concentrates according to the invention also comprise one or more emulsifiers and/or an oil phase in the stated amount. If emulsifiers are used as the sole component II, the proportion of the oil phase is thus 0% and, accordingly, the proportion of the emulsifiers is 0%, if the component II consists only of an oil phase. Preference is given to using a mixture of emulsifier and oil phase as second component.

Suitable emulsifiers are addition products of from 0 to 30 mol of alkylene oxide, in particular ethylene oxide, propylene oxide, butylene oxide onto linear fatty alcohols having 8 to 22 carbon atoms, onto fatty acids having 12 to 22 carbon atoms, onto alkylphenols having 8 to 15 carbon atoms in the alkyl group and onto sorbitan esters; ($C_{12}$-$C_{18}$)-fatty acid mono- and diesters of addition products of from 0 to 30 mol of ethylene oxide onto glycerol; glycerol mono- and diesters and sorbitan mono- and diesters of saturated and unsaturated fatty acids having 6 to 22 carbon atoms and optionally their ethylene oxide addition products; addition products of from 15 to 60 mol of ethylene oxide onto castor oil and/or hydrogenated castor oil; polyol and, in particular, polyglycerol esters, such as, for example, polyglycerol polyricinoleate and polyglycerol poly-12-hydroxystearate. Preference is given to liquid fatty acid esters which may either be ethoxylated (PEG-10 polyglyceryl-2 laurate) or nonethoxylated (polyglyceryl-2 sesquiisostearate).

Further dispersion concentrates according to the invention preferably comprise sorbitol ester prepared by reacting sorbitol with fatty acid methyl esters or fatty acid triglycerides. The fatty acid radical in the fatty acid methyl esters and fatty acid triglycerides generally comprises 8 to 22 carbon atoms and can be straight-chain or branched, saturated or unsaturated. Examples thereof are palmitic acid, stearic acid, lauric acid, linoleic acid, linolenic acid, isostearic acid or oleic acid. Suitable fatty acid triglycerides are all natural animal or vegetable oils, fats and waxes, for example olive oil, rapeseed oil, palm kernel oil, sunflower oil, coconut oil, linseed oil, castor oil, soybean oil, optionally also in refined or hydrogenated form. Since these natural fats, oils and waxes are normally mixtures of fatty acids of varying chain length, this also applies to the fatty acid radicals in the sorbitol esters used according to the invention. The sorbitol esters used according to the invention can also be alkoxylated, preferably ethoxylated.

In addition, it is possible to use anionic emulsifiers, such as ethoxylated and nonethoxylated mono-, di- or triphosphoric esters, but also cationic emulsifiers, such as mono-, di- and trialkyl quats and their polymeric derivatives.

Likewise suitable are mixtures of compounds of two or more of these classes of substance.

As well as comprising AMPS copolymer, the dispersions according to the invention can comprise one or more oils, preferably from the group of hydrocarbons, ester oils, vegetable oils and silicone oils.

The oils used according to the invention include hydrocarbon oils with linear or branched, saturated or unsaturated $C_7$-$C_{40}$-carbon chains, for example Vaseline, dodecane, isododecane, cholesterol, lanolin, hydrogenated polyisobutylenes, docosanes, hexadecane, isohexadecane, paraffins and isoparaffins;

oils of vegetable origin, in particular liquid triglycerides, such as sunflower oil, corn oil, soybean oil, rice oil, jojoba oil, babusscu oil, pumpkin oil, grapeseed oil, sesame oil, walnut oil, apricot oil, macadamia oil, avocado oil, sweet almond oil, lady's smock oil, castor oil, olive oil, groundnut oil, rapeseed oil and coconut oil;

oils of animal origin, for example beef tallow, perhydrosqualene, lanolin;

synthetic oils, such as purcellin oil, linear and/or branched fatty alcohols and fatty acid esters, preferably Guerbet alcohols having 6 to 18, preferably 8 to 10, carbon atoms; esters of linear ($C_6$-$C_{13}$)-fatty acids with linear ($C_6$-$C_{20}$)-fatty alcohols; esters of branched ($C_6$-$C_{13}$)-carboxylic acids with linear ($C_6$-$C_{20}$)-fatty alcohols, esters of linear ($C_6$-$C_{18}$)-fatty acids with branched alcohols, in particular 2-ethylhexanol; esters of linear and/or branched fatty acids with polyhydric alcohols (such as, for example, dimerdiol or trimerdiol) and/or Guerbet alcohols; alcohol esters of $C_1$-$C_{10}$-carboxylic acids or $C_2$-$C_{30}$-dicarboxylic acids, $C_1$-$C_{30}$-carboxylic monoesters and polyesters of sugar, $C_1$-$C_{30}$-monoesters and polyesters of glycerol;

waxes, such as beeswax, paraffin wax or microcrystalline waxes, optionally in combination with hydrophilic waxes, such as, for example, cetylstearyl alcohol; fluorinated and perfluorinated oils;

Monoglycerides of $C_1$-$C_{30}$-carboxylic acids, diglycerides of $C_1$-$C_{30}$-carboxylic acids, triglycerides of $C_1$-$C_{30}$-carboxylic acids, for example triglycerides of caprylic/capric acids, ethylene glycol monoesters of $C_1$-$C_{30}$-carboxylic acids, ethylene glycol diesters of $C_1$-$C_{30}$-carboxylic acids, propylene glycol monoesters of $C_1$-$C_{30}$-carboxylic acids, propylene glycol diesters of $C_1$-$C_{30}$-carboxylic acids, and propoxylated and ethoxylated derivatives of the abovementioned classes of compound.

Suitable silicone oils are dimethylpolysiloxanes, cyclomethicones, polydialkylsiloxanes $R_3SiO(R_2SiO)xSiR_3$, where R is a methyl and ethyl, particularly preferably methyl, and x is a number from 2 to 500, for example dimethicones available under the tradenames VICASIL (General Electric Company), DOW CORNING 200, DOW CORNING 225, DOW CORNING 200 (Dow Corning Corporation). Trimethylsiloxysilicates $[(CH_2)_3SiO)_{1/2}]x[SiO_2]y$, where x is a number from 1 to 500 and y is a number from 1 to 500. Dimethiconoles $R_3SiO[R_2SiO]xSiR_2OH$ and $HOR_2SiO[R_2SiO]xSiR_2OH$, where R is methyl or ethyl and x is a number up to 500, polyalkylarylsiloxanes, for example polymethylphenylsiloxanes obtainable under the tradenames SF 1075 METHYLPHENYL FLUID (General Electric Company) and 556 COSMETIC GRADE PHENYL TRIMETHICONE FLUID (Dow Corning Corporation), polydiarylsiloxanes, silicone resins, cyclic silicones and amino-, fatty acid-, alcohol-, polyether-, epoxy-, fluorine- and/or alkyl-modified silicone compounds, and also polyethersiloxane copolymers, as described in U.S. Pat. No. 5,104,645 and the specifications cited therein, which may either be in liquid form or in resin form at room temperature.

The dispersion concentrates according to the invention can be prepared in various ways, an inverse emulsion polymerization or an inverse mini-emulsion polymerization being as preferred as a physical mixing of AMPS copolymer with oil/emulsifier phase and optionally water phase. The physical mixing is preferably carried out by mixing oil phase and emulsifier(s) at 10 to 60° C., preferably at room temperature, then adding AMPS copolymer(s) to about 40% by weight of the oil/emulsifier phase over a period of from 10 to 60 min, preferably about 30 min, with vigorous stirring. During this, a homogeneous paste forms. If necessary, a small amount of water can be added to improve processing. Then, the remaining oil/emulsifier phase is added with stirring and the mixture is stirred to homogeneity for a number of hours. A liquid, pourable dispersion is formed.

The dispersion concentrates according to the invention are suitable as thickener, bodying agent, emulsifier, solubilizer, dispersant, lubricant, adhesive, conditioner and/or stabilizer—in an excellent manner for the formulation of cosmetic, pharmaceutical and dermatological compositions, in particular of oil-in-water emulsions in the form of creams, lotions, cleansing milk, cream gels, spray emulsions, e.g. body lotions, aftersun lotions, sunscreen compositions and deodorant sprays.

The dispersion concentrates according to the invention are used in the cosmetic and pharmaceutical preparations in amounts by weight such that polymer concentrations are from 0.01 to 10% by weight, preferably 0.1 to 5% by weight, particularly preferably 0.5 to 3% by weight, based on the finished compositions, result.

The compositions according to the invention can comprise anionic, cationic, nonionic, zwitterionic and/or amphoteric surfactants, and also further auxiliaries and additives, cationic polymers, film formers, superfatting agents, stabilizers, biogenic active ingredients, glycerol, preservatives, pearlizing agents, dyes and fragrances, solvents, opacifiers, and also protein derivatives, such as gelatin, collagen hydrolysates, natural and synthetic-based polypeptides, egg yolk, lecithin, lanolin and lanolin derivatives, fatty alcohols, silicones, deodorizing agents, substances with keratolytic and keratoplastic action, enzymes and carrier substances. Furthermore, antimicrobially effective agents can be added to the compositions according to the invention.

In addition, the compositions according to the invention can comprise organic solvents. In principle, suitable organic solvents are all mono- or polyhydric alcohols. Preference is given to using alcohols having 1 to 4 carbon atoms, such as ethanol, propanol, isopropanol, n-butanol, isobutanol, t-butanol, glycerol and mixtures of said alcohols. Further preferred alcohols are polyethylene glycols with a relative molecular mass below 2000. In particular, the use of polyethylene glycol with a relative molecular mass between 200 and 600 and in amounts up to 45% by weight and of polyethylene glycol with a relative molecular mass between 400 and 600 in amounts of from 5 to 25% by weight is preferred. Further suitable solvents are, for example, triacetin (glycerol triacetate) and 1-methoxy-2-propanol. Short-chain anionic surfactants, in particular arylsulfonates, for example cumene- or toluenesulfonate, have a hydrotropic effect.

The following examples of dispersion concentrates with AMPS polymers serve to illustrate the subject matter of the invention in more detail without limiting it thereto (the percentages are percentages by weight).

Various base formulations with different emulsifier and oil concentrations were prepared. The resulting polymer dispersions were assessed according to appearance, viscosity and stability (sedimentation upon storage at 25° C. for 3 weeks). Table 1 shows examples of dispersion concentrates which are flowable and storage-stable.

TABLE 1

| Product name | A | B | C | D |
|---|---|---|---|---|
| Hostacerin AMPS | 32 | 36 | 40 | 30 |
| Hostacerin DGI |  | 30 | 3 | 51 |
| Hostaphat KL 340 D | 18 | 18 | 2 | 13 |
| Emulsogen SRO | 30 |  |  |  |
| Mineral oil, low-viscosity | 10 |  | 27.5 | 6 |
| Isopropyl palmitate | 10 |  | 27.5 |  |
| Myritol 318 |  | 16 |  |  |

The numbers are percentages by weight.
A. Mix oil and/or emulsifier component 3-8 and initially introduce one third of the solution.
B. Over the course of half an hour, add polymer 1-2 with stirring at 400 rpm.
C. After-stir for half an hour then add the remaining solution of A.
D. After-stir for a further 5 hours.

TABLE 2

| Hostacerin AMPS | Ammonium polyacryloyldimethyltaurte |
|---|---|
| Hostacerin DGI | Polyglyceryl-2 sesquiisostearate |
| Hostaphat KL 340 D | Trilaureth-4 phosphate |
| Emulsogen SRO | Rapeseed oil sorbitol esters |
| Myritol 318 | Caprylic/capric triglyceride |

Examples of cosmetic preparations based on the dispersion concentrates according to the invention.

EXAMPLE 1

Moisturizing Lotion

| A | Almond oil | 7.00% |
|---|---|---|
|  | Cyclomethicones | 5.00% |
| B | Dispersion concentrate A | 4.00% |
| C | Glycerol | 7.00% |
|  | Water | ad 100% |
|  | Preservative | q.s. |
| D | Fragrance | 0.30% |

Preparation
I Mix A and B.
II Stir solution C into 1.
III Add D to II.
IV Homogenize
V pH 5.5

EXAMPLE 2

Sunscreen Lotion

| A | Vaseline | 5.00% |
|---|---|---|
|  | Paraffin oil | 10.00% |
|  | Dispersion concentrate B | 2.00% |
|  | Tocopheryl acetate | 1.00% |
|  | Octyl methoxycinnamate | 2.00% |
|  | Parsol 1789 | 0.20% |
| B | Ethanol | 10.00% |
| C | Butylene glycol | 5.00% |
|  | Water | ad 100% |

Preparation

I A and C are heated separately to 75° C., then combined and cooled to 65° C. with stirring, homogenized and further cooled to 35° C., II Stir B into I, homogenize and cool to room temperature

EXAMPLE 3

O/W Skin Milk

Composition

| A | Isopropyl palmitate | 4.00% |
|---|---|---|
|   | Almond oil 5.00% | 4.00% |
|   | Wheatgerm oil | 1.00% |
|   | Cetearyl isononanoate | 8.00% |
|   | ® Cetiol SN (Henkel) |   |
| B | Dispersion concentrate C | 1.50% |
| C | Water | ad 100% |
| D | Fragrances | 0.30% |

Preparation

I Add B to A with stirring

II Stir C and D into I

III Homogenize emulsion

The invention claimed is:

1. A stable dispersion concentrate consisting of:

I) 20 to 40% by weight of a polymer which, in random distribution, consists of 90 to 99.99% by weight of monomers of the formula (1)

$$H_2C=CHCONHC(CH_3)_2CH_2SO_3X \qquad (1)$$

and 0.01 to 10% by weight of crosslinking structures originating from monomers with at least two olefinic double bonds, where X is a cation or a mixture of cations, and X must consist of not more than 10 mol% of protons, and II) 60 to 80% by weight of one or more emulsifiers and/or an oil phase.

2. The dispersion concentrate according to claim 1, wherein the polymer has crosslinking structures originating from monomers with at least two olefinic double bonds, wherein the monomers are selected from the group consisting of acrylic allyl esters, methacrylic allyl esters, dipropylene glycol diallyl ether, polyglycol diallyl ether, triethylene glycol divinyl ether, hydroquinone diallyl ether, tetraallyloxyethane, allyl ethers of multifunctional alcohols, vinyl ethers of multifunctional alcohols, tetraethylene glycol diacrylate, triallylamine, trimethylolpropane diallyl ether, methylenebisacrylamide, divinylbenzene, trimethyloipropane tri(meth)acrylate, and mixtures thereof.

3. The dispersion concentrate as claimed in claim 1, which comprises 21 to 40% by weight of the polymer.

4. The dispersion concentrate as claimed in claim 1, which comprises 30 to 40% by weight of the polymer.

5. The dispersion concentrate as claimed in claim 1, which comprises 60 to 70% by weight of emulsifier and/or oil phase.

* * * * *